United States Patent
Singh et al.

(10) Patent No.: US 11,485,201 B2
(45) Date of Patent: Nov. 1, 2022

(54) HIDDEN DIVISION BAR FOR A VEHICLE WINDOW

(71) Applicant: Rivian IP Holdings, LLC, Plymouth, MI (US)

(72) Inventors: Rajinder P. Singh, Plymouth, MI (US); Richard Maciejewski, Wixom, MI (US); Shun Yi Jin, Northville, MI (US); Mark Taylor, Ypsilanti, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 78 days.

(21) Appl. No.: 17/095,936

(22) Filed: Nov. 12, 2020

(65) Prior Publication Data
US 2022/0144051 A1  May 12, 2022

(51) Int. Cl.
*B60J 5/04* (2006.01)
*B60J 1/16* (2006.01)
*B60J 10/74* (2016.01)
*B60J 1/17* (2006.01)
B60J 3/00 (2006.01)
B60J 1/10 (2006.01)

(52) U.S. Cl.
CPC .............. *B60J 5/0402* (2013.01); *B60J 1/16* (2013.01); *B60J 1/17* (2013.01); *B60J 10/74* (2016.02); *B60J 1/10* (2013.01); *B60J 3/00* (2013.01); *B60J 5/0406* (2013.01)

(58) Field of Classification Search
CPC . B60J 5/0402; B60J 10/76; B60J 10/74; B60J 1/17; B60J 1/16

USPC ....................................................... 296/146.2
See application file for complete search history.

(56) References Cited

U.S. PATENT DOCUMENTS

| | | | | |
|---|---|---|---|---|
| 3,799,607 A * | 3/1974 | Shakespear | ............. | B60J 10/74 |
| | | | | D12/183 |
| 4,034,509 A * | 7/1977 | DeRees | ................. | E05F 11/445 |
| | | | | 49/353 |
| 4,473,252 A * | 9/1984 | Tomforde | .................. | B60J 1/17 |
| | | | | 49/502 |
| 5,007,201 A * | 4/1991 | D'Hoore | ................ | B60J 5/0402 |
| | | | | 49/502 |
| 8,333,423 B2 * | 12/2012 | Gulker | ....................... | B60J 1/20 |
| | | | | 296/180.1 |
| 8,727,395 B2 * | 5/2014 | Nania | ........................ | B60J 1/16 |
| | | | | 292/160 |
| 10,974,576 B2 * | 4/2021 | Choi | ........................ | B60J 10/79 |
| 11,059,360 B2 * | 7/2021 | Guellec | .................... | B60J 10/79 |

(Continued)

*Primary Examiner* — Jason S Morrow
(74) *Attorney, Agent, or Firm* — Haley Guiliano LLP

(57) ABSTRACT

A vehicle window system includes a vehicle door that has a window region. The system includes a fixed window having an exterior surface and an interior surface, a division bar, and a movable window. The fixed window is arranged in a first portion of the window region, and the division bar is arranged along a first region of the interior surface. The movable window is arranged in a second portion of the window region and is configured to close against the division bar. The division bar is not directly visible from outside of the vehicle door when viewed at an elevation of the fixed window. To illustrate, the movable window can be configured to move vertically within the first portion of the window region and the fixed window arranged at the top of the window region and the division bar is arranged substantially horizontally along the interior surface.

20 Claims, 7 Drawing Sheets

(56) References Cited

U.S. PATENT DOCUMENTS

| | | | |
|---|---|---|---|
| 11,104,211 B2* | 8/2021 | Takahashi | E05D 15/165 |
| 11,167,628 B2* | 11/2021 | Grüter et al. | B60J 10/88 |
| 11,247,546 B2* | 2/2022 | Tooker | B29C 48/16 |
| 2009/0160220 A1* | 6/2009 | Elijah | B60J 5/0487 |
| | | | 277/650 |
| 2009/0293367 A1* | 12/2009 | Gwak | B60J 1/16 |
| | | | 49/484.1 |
| 2012/0248816 A1* | 10/2012 | Wan | E05C 1/08 |
| | | | 49/149 |
| 2016/0185190 A1* | 6/2016 | Thomas | B60J 1/085 |
| | | | 49/463 |
| 2020/0040641 A1* | 2/2020 | Eck | B60J 1/007 |
| 2022/0010601 A1* | 1/2022 | Klaameyer | E05B 83/40 |
| 2022/0055459 A1* | 2/2022 | Toyota | B60J 1/17 |

* cited by examiner

HIDDEN DIVISION BAR FOR A VEHICLE WINDOW

INTRODUCTION

The present disclosure is directed towards two-part vehicle windows, and more particularly towards a window having fixed and movable sections separated by a hidden divider.

SUMMARY

In some embodiments, the present disclosure is directed to a vehicle window system. The system includes a vehicle door having a window region, a fixed window, a movable window, and a division bar. The fixed window is arranged in a first portion of the window region, and includes both an exterior surface and an interior surface. The division bar is arranged along a first region of the interior surface. The movable window is arranged in a second portion of the window region. The movable window is configured to close against the division bar, and the division bar is not directly visible from outside of the vehicle door when viewed at an elevation of the fixed window. In some embodiments, the division bar is arranged along a path that corresponds to the upper edge of the movable window.

In some embodiments, the movable window is configured to move substantially vertically, the first portion of the window region is arranged at a top of the window region, the second portion of the window region is arranged at a bottom of the window region, and the division bar is arranged substantially horizontally along the interior surface.

In some embodiments, the movable window is configured to move substantially horizontally, the first portion of the window region is arranged at a front of the window region, the second portion of the window region is arranged at a rear of the window region, and the division bar is arranged substantially vertically along the interior surface.

In some embodiments, the fixed window is arranged laterally outside of the movable window by a first amount such that the fixed window and the movable window substantially form a backwards-facing step. For example, the fixed window may be arranged longitudinally (e.g., front to back) in front of the movable window.

In some embodiments, the vehicle door includes at least one seal arranged along the division bar such that the movable window is capable of closing against the at least one seal. In some embodiments, the at least one seal extends along at least some of a perimeter of the window region to guide the movable window as it opens and closes.

In some embodiments, the fixed window and the movable window are offset laterally by a first distance, and wherein the fixed window is arranged outside of the movable window by the first distance. For example, when viewed from outside the vehicle from the side, the fixed window is closer than the movable window by the first distance. The first distance may an inch or less, or more than an inch.

In some embodiments, fixed window and the movable window overlap vertically by a second distance when the movable window is closed. For example, in some embodiments, the movable window closes to a position that overlaps with the fixed window wherein the top edge of the movable window is above the bottom edge of the fixed window.

In some embodiments, the fixed window includes a tint arranged to visually obscure the division bar when viewed from the outside of the vehicle door. The tint is overlaid, integrated, or a combination thereof. The tint is arranged over the entire fixed window or a portion thereof such as the perimeter, for example.

In some embodiments, the vehicle door includes an outer panel configured to form part of a vehicle exterior and an inner panel comprising the division bar. For example, in some embodiments, the vehicle door is constructed of an inner and outer sheet metal panel that are joined to form the door structure.

In some embodiments, the movable window, when opened, fits entirely within the vehicle door. In some embodiments, the window region is configured to be arranged between an A-pillar and a B-pillar of a vehicle. For example, the window region may be a driver's side front window of a vehicle.

In some embodiments, the vehicle door includes a bonding material arranged in the first region between the division bar and the fixed window. For example, the bonding material may include a urethane strip or sealant.

In some embodiments, the vehicle door includes a frame structure, and a window actuator secured to the frame structure and coupled to the movable window. The window actuator is configured to cause the movable window to move up or down, while the fixed window is not capable of moving relative to the frame structure.

In some embodiments, the present disclosure is directed to a vehicle that includes an occupant compartment and a frame structure. The frame structure is arranged at lateral sides of the passenger compartment, and a window region is arranged along an upper region of the frame structure. A fixed window is arranged in a first portion of the window region, and the fixed window includes an exterior surface and an interior surface. A division bar is arranged along a first region of the interior surface. A movable window is arranged in a second portion of the window region. The movable window is configured to close against the division bar, and the division bar is not directly visible from outside of the vehicle when viewed at an elevation of the fixed window. For example, in some embodiments, the vehicle includes one or more vehicle doors described above, in which the one or more vehicle doors each includes the frame structure, the fixed window, the movable window, and the division bar. In a further example, in some embodiments, the window region is configured to be arranged between an A-pillar and a B-pillar of the vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Vehicle windows can be large, and accordingly sometimes will not retract entirely within the door when lowered. Partitioning the window into a fixed section and movable section allows a portion of the window to be movable. However, partitioning can require a divider or other intermediate component that can detract from the appearance of the vehicle. A window area would generally be preferred to be seamless, without intermediate structures or seams, for a stylish appearance. The present disclosure is directed to window systems having a hidden division bar, thus providing a seamless appearance. For example, in some embodiments, the window systems of the present disclosure include division bars that are not directly visible outside of the vehicle when viewed at the elevation of the fixed window.

Figure 1:
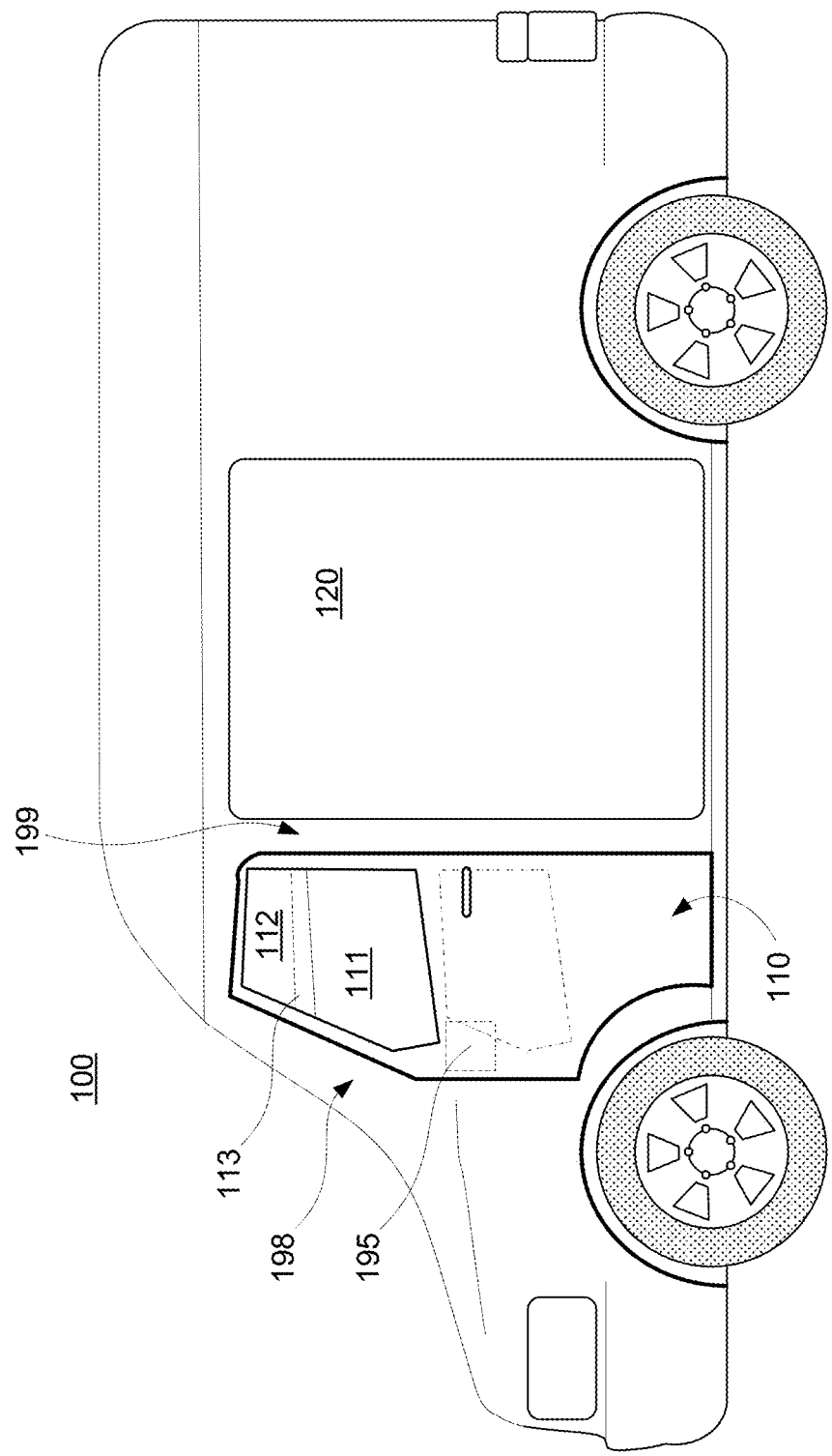
FIG. 1 shows a side view of an illustrative vehicle having a hidden division bar, in accordance with some embodiments of the present disclosure.

FIG. 1 shows a side view of illustrative vehicle 100 having hidden division bar 113, in accordance with some embodiments of the present disclosure. Vehicle 100 includes doors 110 and 120. Vehicle door 110 that includes a window region that includes fixed window 112 arranged in a first portion of the window region and movable window 111 arranged in a second portion of the window region. Fixed window 112 includes an exterior surface and an interior surface. Division bar 113 is arranged along a first region of the interior surface. Movable window 111 is configured to close against division bar 113, and division 113 bar is not directly visible from outside of vehicle door 110. Movable window 111, as illustrated, is configured to moved substantially vertically (e.g., vertical or off-vertical to follow the contouring of the vehicle which need not be exactly vertical and may include some slant or curve that deviates from vertical). The first portion of the window region is arranged at a top of the window region corresponding to fixed window 112. The second portion of the window region is arranged at a bottom of the window region corresponding to movable window 111. Division bar 113, as illustrated, is arranged substantially horizontally along the interior surface (e.g., including horizontal, slanting, curved, or compound shaped to follow the contouring of either fixed window 112 or movable window 211). Division bar 113, while horizontal or nearly horizontal (within 10 degrees) in some embodiments, may be oriented at an angle (e.g., slanted at any suitable angle), vertical (at 90 degrees from horizontal), or mostly horizontal with curves or steps to follow a contour. As illustrated, vehicle door 110 is a front door (e.g., a driver's side door) with the window region arranged between A-pillar 198 and B-pillar 199. Actuator 195 is configured to actuate movable window 111 substantially vertically (e.g., open and close movable window 111 along an exactly vertical, angled, or contoured path), and may include, for example, a motor, a linkage (e.g., a scissor mechanism), a rack and pinion mechanism, any other suitable components, or any combination thereof. To illustrate, movable window 111 is shown in a fully retracted position by the dash-dot line in FIG. 1, within the structure of vehicle door 110.

As illustrated, fixed window 112 is arranged laterally outside of movable window 111 such that fixed window 112 and movable window 111 are offset by a first distance. In some embodiments, as illustrated, fixed window 112 and movable window 111 overlap vertically by a second distance when the movable window is closed. As illustrated, because fixed window 112 and movable window 111 overlap vertically, division bar 113 is obscured from view from outside of vehicle 100. In an illustrative example, fixed window 112 includes a tint or fret arranged to visually obscure division bar 113 when viewed from the outside of vehicle door 110. For example, the entire fixed window 112 may be tinted or only a portion (e.g., a bottom portion). In some embodiment, the window assembly includes at least one seal arranged along division bar 113 such that movable window 111 is capable of closing against the seal. In some embodiments, the at least one seal extends along at least some of a perimeter of the window region to guide the movable window 111 as it opens and closes.

While not illustrated in FIG. 1, in some embodiments, a movable window may be configured to moved substantially horizontally, with the first portion of the window region arranged at a front of the window region and the second portion of the window region arranged at a rear of the window region. In some such embodiments, the division bar is arranged substantially vertically along the interior surface.

Figure 2:
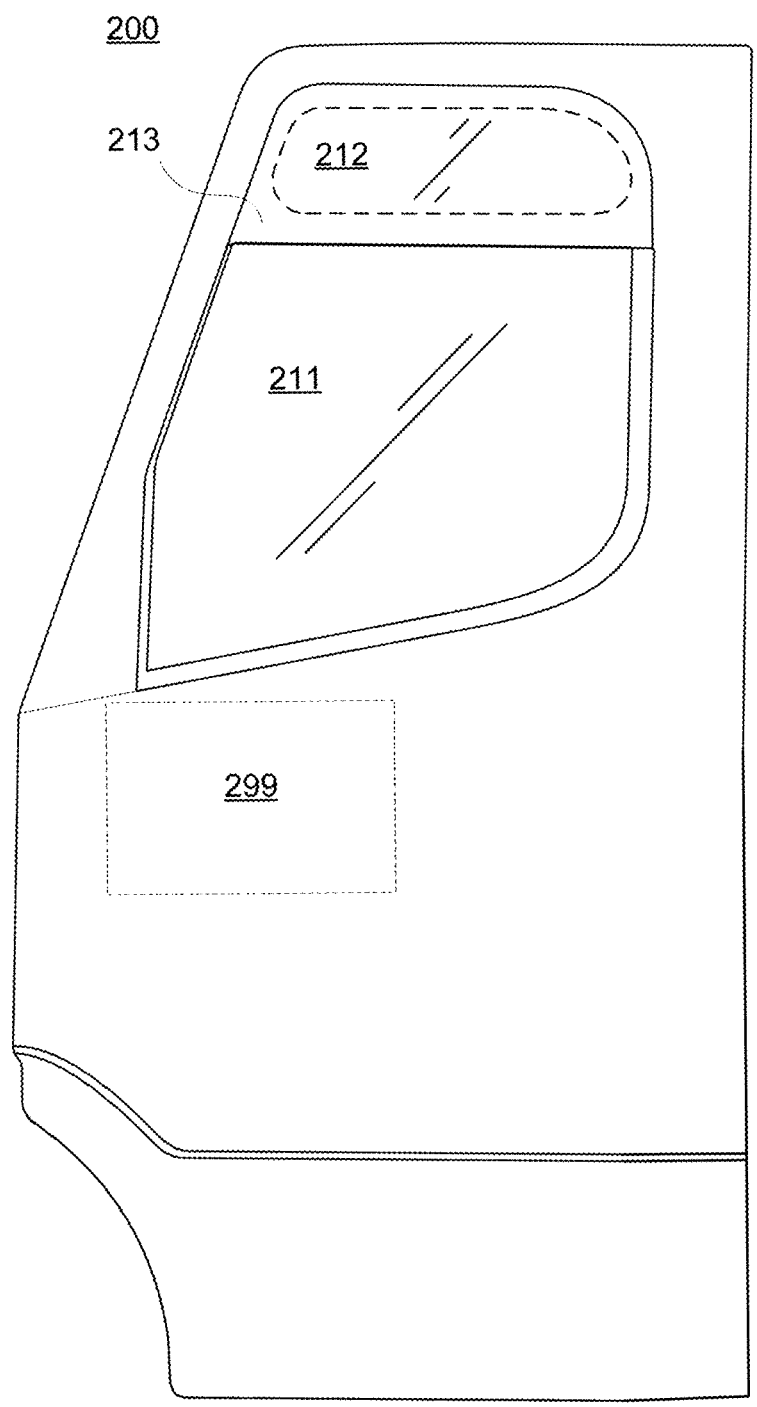
FIG. 2 shows a side view of an illustrative vehicle door having a hidden division bar, in accordance with some embodiments of the present disclosure.
Figure 4:
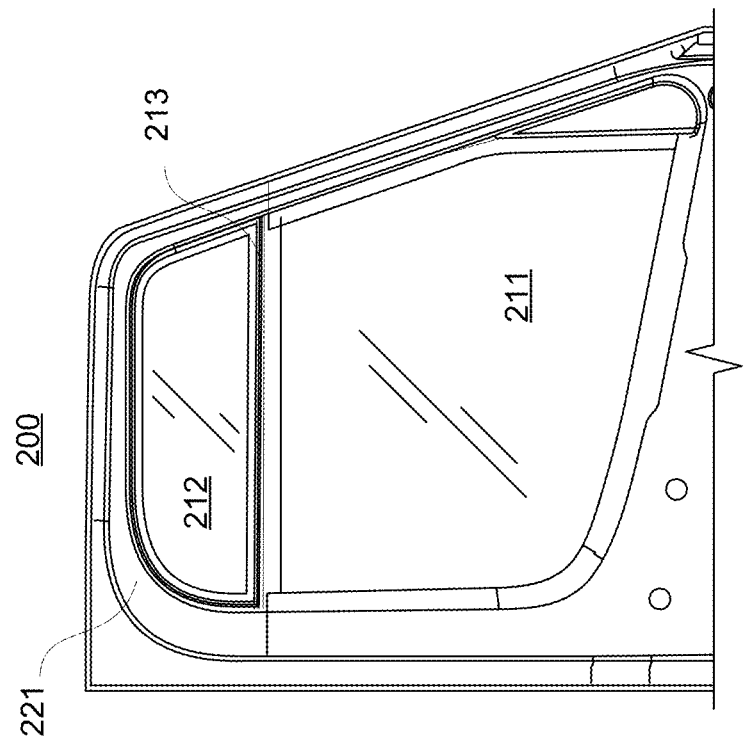
FIG. 4 shows a side view of a portion of the illustrative vehicle door of FIG. 2 from the inside, in accordance with some embodiments of the present disclosure.
Figure 3:
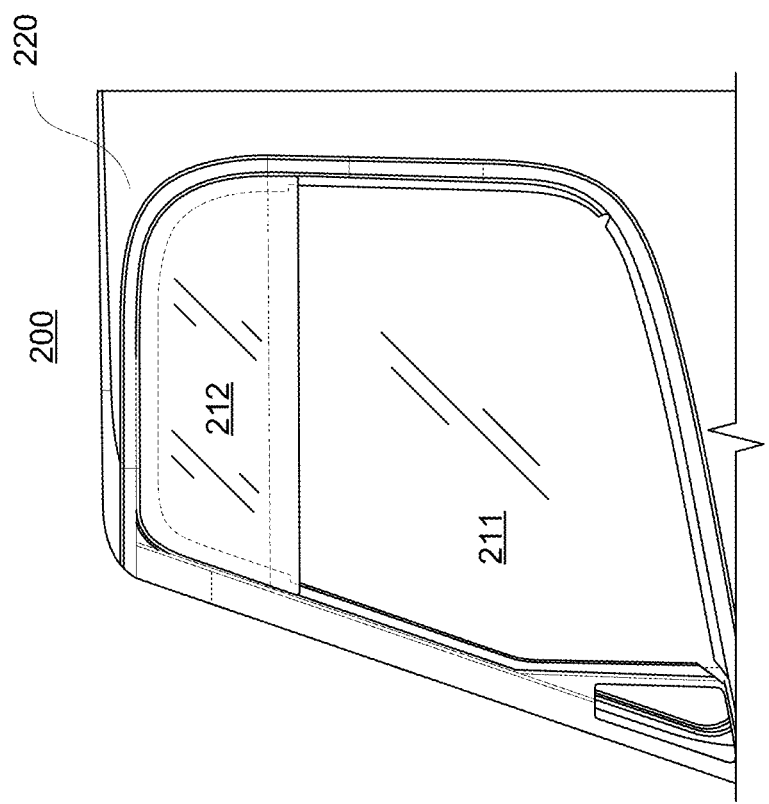
FIG. 3 shows a side view of a portion of the illustrative vehicle door of FIG. 2 from the outside, in accordance with some embodiments of the present disclosure.
Figure 5:
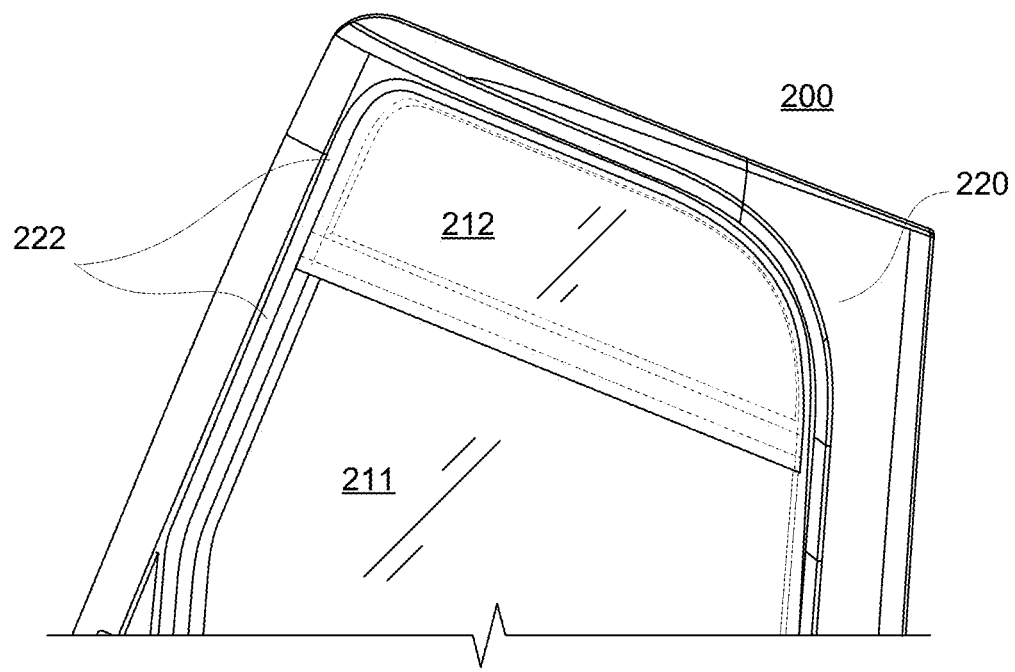
FIG. 5 shows an elevated perspective view of a portion of the illustrative vehicle door of FIG. 2 from the outside, in accordance with some embodiments of the present disclosure.
Figure 6:
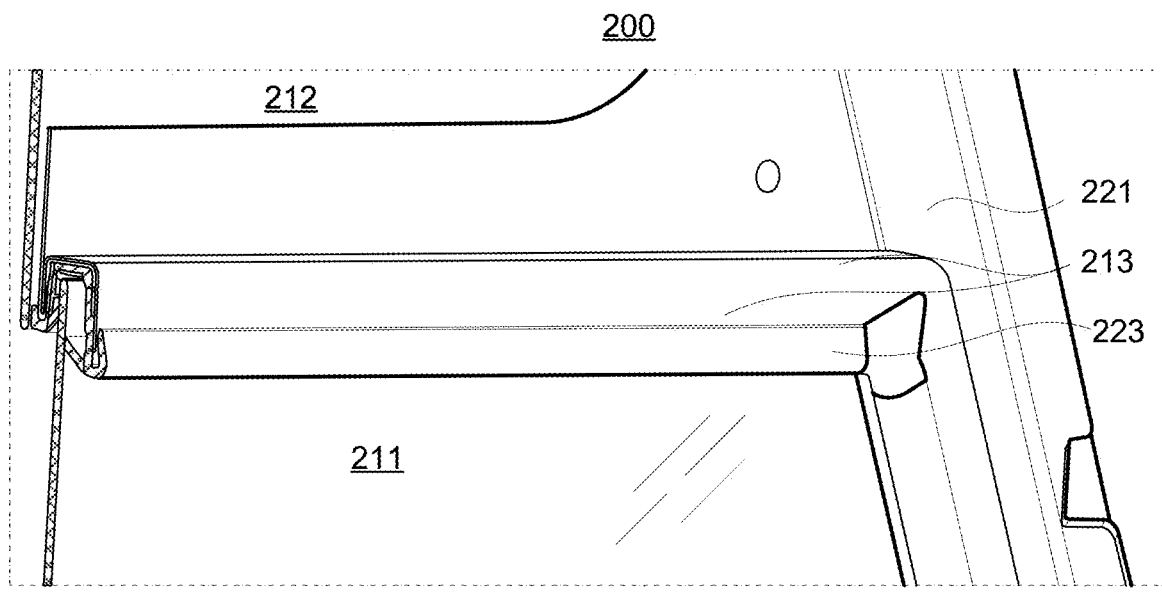
FIG. 6 shows a side view of a portion of the illustrative vehicle door of FIG. 2 from the inside, illustrating the division bar, in accordance with some embodiments of the present disclosure.

FIG. 2 shows a side view of illustrative vehicle door 200 having a hidden division bar (e.g., division bar 213), in accordance with some embodiments of the present disclosure. FIG. 3 shows a side view of a portion of illustrative vehicle door 200 of FIG. 2 from the outside, in accordance with some embodiments of the present disclosure. FIG. 4 shows a side view of a portion of illustrative vehicle door 200 of FIG. 2 from the inside, in accordance with some embodiments of the present disclosure. FIG. 5 shows an elevated perspective view of a portion of illustrative vehicle door 200 of FIG. 2 from the outside, in accordance with some embodiments of the present disclosure. FIG. 6 shows a side view of a portion of illustrative vehicle door 200 of FIG. 2 from the inside, illustrating division bar 213, in accordance with some embodiments of the present disclosure.

As illustrated, vehicle door 200 is similar to vehicle door 110 of FIG. 1, having fixed window 212, movable window 211 and division bar 213. Vehicle door 200, as illustrated, includes outer panel 220 and inner panel 221, which are joined to form the structure of vehicle door 200. Fixed window 212 is either not movable, or otherwise not retractable into vehicle door 200 as movable window 211 is. For example, fixed window 212 may be stationary, or may be capable of tilting or partially opening outward (e.g., to vent). In some circumstances, a window area is partitioned into fixed and movable regions because a single window the size and shape of the entire window region would not fit within the door. As illustrated in FIGS. 2-6, movable window 211 is capable of being fully lowered below the window region in vehicle door 200.

In some embodiments, as illustrated, division bar 213 is formed at least partially by inner panel 221, which includes formed sheet metal (e.g., as illustrated in FIG. 4). In some embodiments, vehicle door 200 includes a mechanism (e.g., indicated by mechanism 299 within the structure of vehicle door 200) to raise and lower movable window 211 such as, for example, an electric motor coupled to linkages, a rack and pinion assembly, any other suitable automatically or manually operated assembly, or any combination thereof. As illustrated in FIG. 5, a lateral offset may exist between fixed window 212 and movable window 211. For example, fixed window 212 is located laterally a distance outside of movable window 211. To illustrate, the distance may be fractions of an inch (e.g., a quarter, a half, three-quarters of an inch, or any other fraction), or more, in accordance with the present disclosure. Seals 222 (exterior) and 223 (interior) may extend along the perimeter of movable window 211, fixed window 212 or both (as illustrated).

Figure 8:
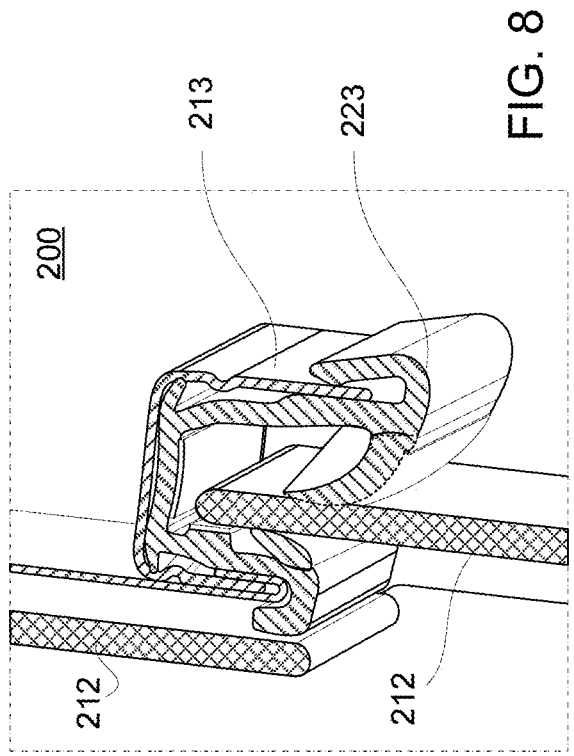
FIG. 8 shows a cross section perspective view of a portion of the illustrative vehicle door of FIG. 2 from the lower rear, in accordance with some embodiments of the present disclosure.
Figure 9:
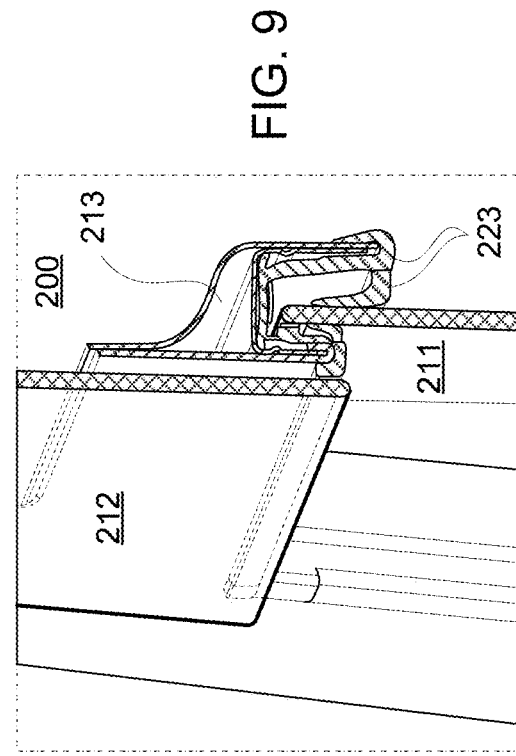
FIG. 9 shows an elevated cross section perspective view of a portion of the illustrative vehicle door of FIG. 2 from the rear, in accordance with some embodiments of the present disclosure.
Figure 7:
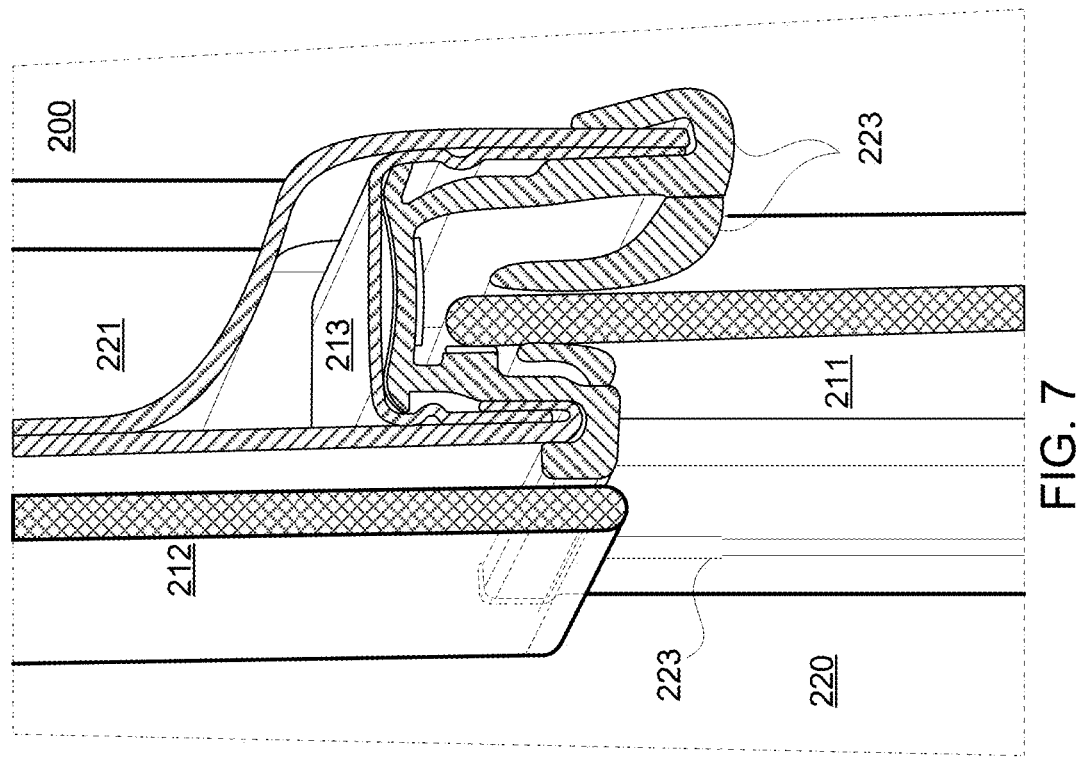
FIG. 7 shows a cross section perspective view of a portion of the illustrative vehicle door of FIG. 2 from the rear, in accordance with some embodiments of the present disclosure.

FIG. 7 shows a cross section perspective view of a portion of the illustrative vehicle door of FIG. 2 from the rear, in accordance with some embodiments of the present disclosure. FIG. 8 shows a cross section perspective view of a portion of the illustrative vehicle door of FIG. 2 from the lower rear, in accordance with some embodiments of the present disclosure. FIG. 9 shows an elevated cross section perspective view of a portion of the illustrative vehicle door of FIG. 2 from the rear, in accordance with some embodiments of the present disclosure.

In some embodiments, as illustrated, division bar 213 is included as part of inner panel 221, and interfaces to outer panel 220. As illustrated, seal 223 is arranged to interface to division bar 213 by being inserted into a recess of division bar 213. Seal 223 is configured to seal against movable window 211. For example, as illustrated, seal 223 extends along the sides of movable window 211 and along division bar 312. Thus seal 223 as illustrated seals the sides the movable window 211 and also seals against the top edge of movable window 211 when movable window 211 is closed (e.g., rolled up or otherwise actuated upwards). Seal 223 is substantially U-shaped, having a member on each face (e.g., inner and outer) of movable window 211 to seal both internally and externally.

Figure 10:
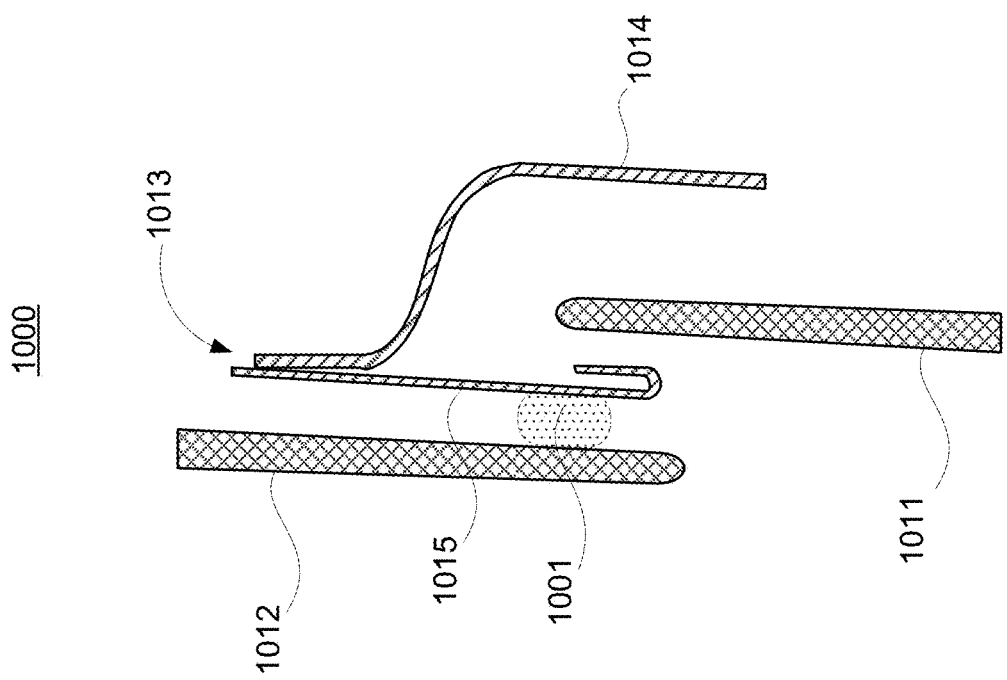
FIG. 10 shows a cross section view of an illustrative fixed member, movable member, and division bar, in accordance with some embodiments of the present disclosure.

FIG. 10 shows a cross section view of illustrative fixed member 1012, movable member 1012, and division bar 1013, in accordance with some embodiments of the present disclosure. As illustrated, division bar 1013 includes outer element 1015 and inner element 1014, which are configured to accommodate an end of movable member 1012. Fixed member 1012 and movable member 1011 may correspond to windows (e.g., as illustrated in FIGS. 2-9). In some embodiments, as illustrated, seal 1001 (e.g., a bonding material) is included between division bar 113 and fixed member 1012. To illustrate, seal 1001 may include urethane (e.g., a bead of urethane or urethane tape may be applied to one or both surfaces before assembly).

Figure 11:
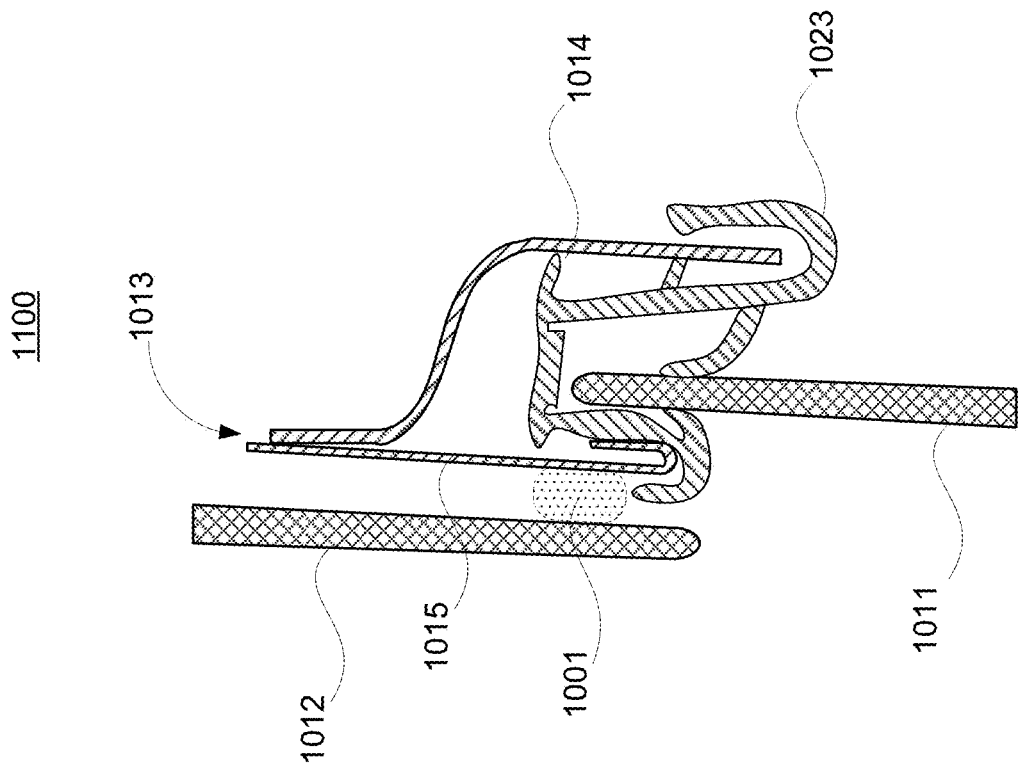
FIG. 11 shows a cross section view of the illustrative fixed member, movable member, and division bar of FIG. 10 with a seal included, in accordance with some embodiments of the present disclosure.

FIG. 11 shows a cross section view of illustrative fixed member 1012, movable member 1011, and division bar 1013 of FIG. 10 with seal 1023 included, in accordance with some embodiments of the present disclosure. Division bar 1013, as illustrated, includes member 1015 and member 1014 (e.g., which form a U-shaped structure as illustrated). Member 1015 is configured to be affixed to fixed member 1012 by seal 1001, which may include, for example, a strip of urethane or other suitable sealant. Seal 1023 may include, for example, a rubber material or any other suitable material (e.g., that is suitably flexible, soft, durable, and formable).

Figure 12:
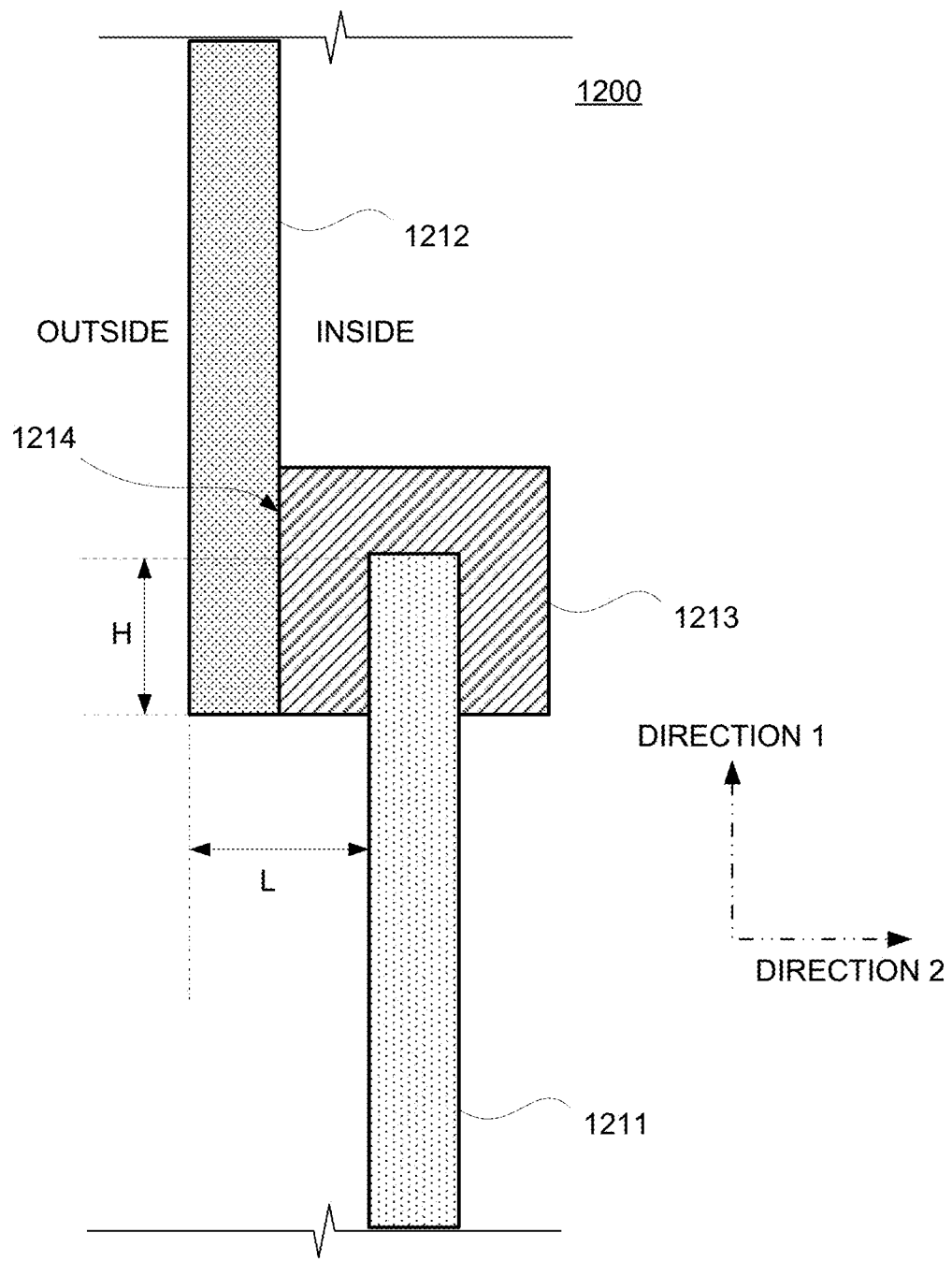
FIG. 12 shows a cross section view of an illustrative window assembly having a division bar, in accordance with some embodiments of the present disclosure.

FIG. 12 shows a cross section view of illustrative window assembly 1200 having a division bar, in accordance with some embodiments of the present disclosure. Window assembly 1200 includes first window 1212, second window 1211, and division bar 1213 (e.g., arranged along region 1214 of first window 1212). The outside and inside of window assembly 1200 are annotated in FIG. 12. First window 1212 and second window 1211 are laterally offset by a distance "L," which may be an inch, a fraction of an inch, or larger than an inch. First window 1212 and second window 1211 overlap by a distance "H," which may be an inch, a fraction of an inch, or larger than an inch. In some embodiments, the distance "L" is minimized or otherwise designed to be relatively small (e.g., fractions of an inch, or 17 mm or less) to provide a seamless appearance. Division bar 1213 may include, for example, sheet metal, rubber, seals, any other suitable components, or any combination thereof.

In some embodiments, FIG. 12 shows a cross-section view as viewed in a substantially horizontal direction (e.g., forward or rearward, wherein Direction 1 is vertical and direction 2 is lateral). Substantially horizontal includes exactly horizontal, angled from horizontal, contoured to follow a path that is mostly horizontal, or otherwise following a path that from end-to-end is elevated less than 45 degrees from horizontal. Accordingly, in some such embodiments, first window 1212 is an upper window and second window 1211 is a lower window. In some embodiments, second window 1211 is movable (e.g., along direction 1).

In some embodiments, FIG. 12 shows a cross-section view as viewed in a substantially vertical direction (e.g., upwards or downwards, wherein Direction 1 is horizontal and direction 2 is lateral). Substantially vertical includes exactly vertical, angled from vertical, contoured to follow a path that is mostly vertical, or otherwise following a path that from end-to-end is elevated more than 45 degrees from horizontal. Accordingly, in some such embodiments, first window 1212 is a front window and second window 1211 is a rear window. In some embodiments, second window 1211 is movable (e.g., into or out of the page as illustrated in a direction normal to both Direction 1 and Direction 2). In some such embodiments, fixed window 1212 is arranged laterally outside of movable window 1211 by a first amount such that fixed window 1212 and movable window 1211 substantially form a backwards-facing step (e.g., Direction 1 is forward, towards the front of the vehicle).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A vehicle window system comprising:
   a vehicle door having a window region;
   a fixed window arranged in a first portion of the window region, wherein the fixed window comprises an exterior surface and an interior surface;
   a division bar arranged along a first region of the interior surface;
   a movable window arranged in a second portion of the window region, wherein:
     the movable window is configured to close against the division bar, and
     the division bar is not directly visible from outside of the vehicle door when viewed at an elevation of the fixed window.

2. The vehicle door of claim 1, wherein:
   the movable window is configured to move substantially vertically;
   the first portion of the window region is arranged at a top of the window region;
   the second portion of the window region is arranged at a bottom of the window region; and
   the division bar is arranged substantially horizontally along the interior surface.

3. The vehicle door of claim 1, wherein:
   the first portion of the window region is arranged at a front of the window region;
   the second portion of the window region is arranged at a rear of the window region; and
   the division bar is arranged substantially vertically along the interior surface.

4. The vehicle door of claim 3, wherein the fixed window is arranged laterally outside of the movable window by a first amount such that the fixed window and the movable window form a backwards-facing step.

5. The vehicle door of claim 1, further comprising:
   at least one seal arranged along the division bar such that the movable window is capable of closing against the at least one seal.

6. The vehicle door of claim 5, wherein the at least one seal extends along at least some of a perimeter of the window region to guide the movable window as it opens and closes.

7. The vehicle door of claim 1, wherein the fixed window and the movable window are offset laterally by a first distance, and wherein the fixed window is arranged outside of the movable window by the first distance.

8. The vehicle door of claim 7, wherein the fixed window and the movable window overlap vertically by a second distance when the movable window is closed.

9. The vehicle door of claim 1, wherein the fixed window comprises a tint arranged to visually obscure the division bar when viewed from the outside of the vehicle door.

10. The vehicle door of claim 1, further comprising:
    an outer panel configured to form part of a vehicle exterior; and
    an inner panel comprising the division bar.

11. The vehicle door of claim 1, wherein the movable window, when opened, fits entirely within the vehicle door.

12. The vehicle door of claim 1, wherein the window region is configured to be arranged between an A-pillar and a B-pillar of a vehicle.

13. The vehicle door of claim 1, further comprising a bonding material arranged in the first region between the division bar and the fixed window.

14. The vehicle door of claim 1, further comprising:
    a frame structure; and
    a window actuator secured to the frame structure and coupled to the movable window, wherein the window actuator is configured to cause the movable window to move up or down, and wherein the fixed window is not capable of moving relative to the frame structure.

15. The vehicle door of claim 1, wherein the division bar is arranged along a path that corresponds to an upper edge of the movable window.

16. A vehicle comprising:
    an occupant compartment; and
    a frame structure arranged at lateral sides of the passenger compartment;
    a window region arranged along an upper region of the frame structure;
    a fixed window arranged in a first portion of the window region, wherein the fixed window comprises an exterior surface and an interior surface;
    a division bar arranged along a first region of the interior surface;
    a movable window arranged in a second portion of the window region, wherein:
      the movable window is configured to close against the division bar, and
      the division bar is not directly visible from outside of the vehicle when viewed at an elevation of the fixed window.

17. The vehicle of claim 16, further comprising a vehicle door, wherein the vehicle door comprises the frame structure, the fixed window, the movable window, and the division bar.

18. The vehicle of claim 16, wherein the window region is configured to be arranged between an A-pillar and a B-pillar of the vehicle.

19. The vehicle of claim 16, wherein:
    the movable window is configured to move substantially vertically;
    the first portion of the window region is arranged at a top of the window region;
    the second portion of the window region is arranged at a bottom of the window region; and
    the division bar is arranged substantially horizontally along the interior surface.

20. The vehicle of claim 16, wherein:
    the movable window is configured to move substantially horizontally;
    the first portion of the window region is arranged at a front of the window region;
    the second portion of the window region is arranged at a rear of the window region; and
    the division bar is arranged substantially vertically along the interior surface.

* * * * *